July 25, 1961 R. R. BARNES 2,993,958
RADIANT ENERGY RECEIVING SYSTEM
Filed Oct. 17, 1956
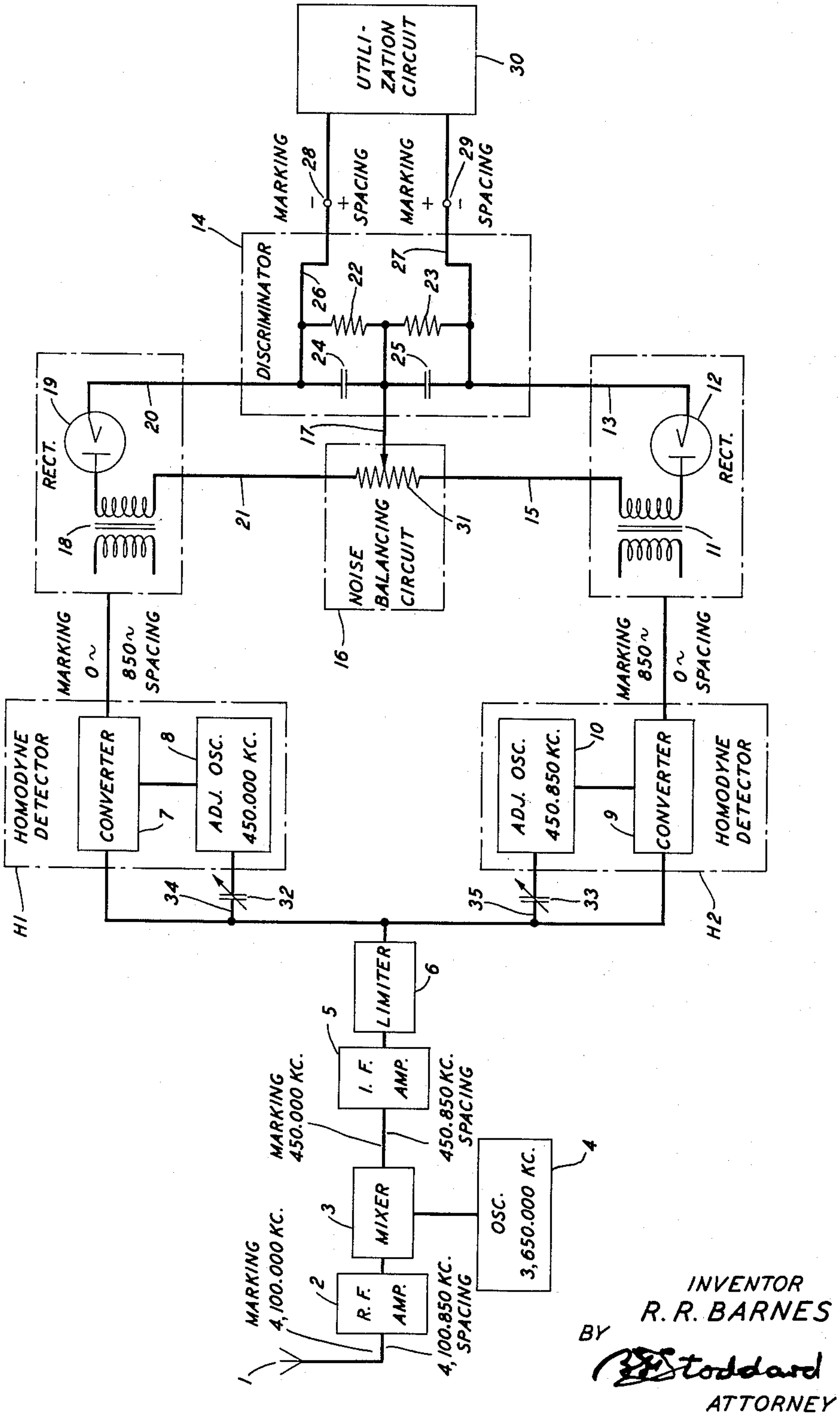
INVENTOR
R. R. BARNES
BY
B. E. Stoddard
ATTORNEY 2,993,958

RADIANT ENERGY RECEIVING SYSTEM

Richard R. Barnes, Stirling, N.J., assignor to American Telephone and Telegraph Company, a corporation of New York Filed Oct. 17, 1956, Ser. No. 616,401
3 Claims. (Cl. 178—88)

This invention relates to radio telegraph receiving circuits and, more particularly, to a differential homodyne detection circuit for detecting frequency-shift radio telegraph signals.

It is well known in the radio telegraph signaling art that errors in the reception of signals can be avoided to a considerable extent by employing a form of frequency modulation transmission in which the frequency of the carrier wave energy is shifted from one value for marking telegraph signals to another value for spacing telegraph signals. Telegraph signals transmitted by this method are commonly called frequency-shift signals. Of the various circuit constructions designed to receive frequency-shift telegraph signals, one that has been widely used employs two parallel filters having different pass bands for separating the marking and spacing signals. This type of receiving circuit has been found to function satisfactorily when its components, including the filters, have been designed for operation with two specific carrier frequencies. However, when a receiving circuit of this type has been constructed for operation with a particular pair of signaling frequencies, it cannot be readily changed for operation with a different pair of carrier frequencies.

Accordingly, it is an object of this invention to provide a radio telegraph receiving circuit with improved means for detecting frequency-shift signals.

It is also an object of this invention to provide a radio telegraph receiving circuit with improved frequency-shift detecting means which may be readily adjusted for operation with signals having different frequency separations.

A further object of this invention is to provide a radio receiving circuit with improved means for eliminating noise currents and undesired signals.

These and other objects of the invention are accomplished by connecting two intermediate frequency homodyne detection circuits in parallel in the intermediate frequency portion of a radio telegraph receiving circuit. In order to separate the marking signals from the spacing signals, the beating oscillator in one detection circuit is designed to operate at the marking intermediate frequency while the beating oscillator in the other detection circuit operates at the spacing intermediate frequency. The two homodyne detectors have their outputs oppositely coupled to a discriminator provided with a noise balancing circuit. Thus, any noise currents or interfering signals which may be present are applied as equal and opposing voltages to the opposite inputs of the discriminator and are eliminated through cancellation. This receiving circuit may be readily adjusted for operation with signals having different frequency separations by changing the oscillating frequency of one or both of the oscillators in order to obtain the desired homodyne action. In addition, this receiving circuit may be readily adapted for use in a radio system employing the single frequency type of signal transmission by causing one beating oscillator to operate at the desired signal frequency and by causing the other beating oscillator to operate at a suitably different frequency. This receiving circuit may also be employed to detect wave energy of a specified frequency from among a group of received wave energies of various frequencies.

These and other features of the invention are more fully decsribed in connection with the following detailed description of the drawing which is a schematic diagram of a frequency-shift radio telegraph receiving circuit in accordance with the invention.

In the frequency-shift radio telegraph receiving circuit shown in the drawing, an antenna 1 is represented as alternatively receiving marking carrier waves and spacing carrier waves having a fixed frequency separation between them. These signaling waves may be of any suitable frequency values. For purposes of illustration, the marking waves are indicated in the drawing as having a radio frequency of 4,100.000 kilocycles and the spacing waves a radio frequency of 4,100.850 kilocycles. Thus, the fixed frequency difference between these waves is 850 cycles.

These carrier waves received by the antenna 1 are applied to a conventional radio frequency amplifier 2 which may comprise one or more amplifying stages connected in cascade. The resulting amplified signaling energy is next applied to a mixer 3 where it is heterodyned with suitable oscillatory wave energy from a local high frequency oscillator 4 to produce corresponding intermediate frequency wave energy. In the drawing, the frequency of the oscillator 4 is represented as being 3,650.000 kilocycles with the result that the marking intermediate frequency waves have a frequency of 450.000 kilocycles and the spacing intermediate frequency waves have a frequency of 450.850 kilocycles. It is to be noted that this frequency conversion does not alter the fixed frequency separation of 850 cycles between the marking and spacing signals.

The intermediate frequency signals are now applied to an intermediate frequency amplifier 5 of any suitable design which, in addition to amplifying the signals, has a band pass characteristic which restricts the signal band width to an extent not much wider than that required to pass both the marking and spacing signals. Its frequency response curve should preferably be flat-topped with both the marking and spacing signals lying within the flat portion of the curve. The resulting output from the intermediate frequency amplifier 5 is supplied to a conventional amplitude limiting circuit 6 which is so designed as to insure that the marking and spacing signals are of the same amplitude and that the amplitude of any noise currents or interfering signals which might be included in the output from the intermediate frequency amplifier 5 does not exceed the amplitude of the marking and spacing signals.

The output energy from the limiter 6 is delivered to two parallel homodyne detection circuits H1 and H2 for obtaining corresponding alternative marking and spacing low frequency waves. In the upper detecting circuit H1, the intermediate frequency energy is heterodyned in a non-tuned converter 7 with wave energy from an intermediate frequency adjustable oscillator 8. It is to be noted that the beating oscillator 8 is adjusted to generate waves having a frequency of 450.000 kilocycles which is exactly the same as the frequency of the marking intermediate frequency waves. Therefore, when a marking signal is received, a homodyne action will take place in the converter 7. Since there will now be zero beat between the marking signal and the energy from the oscillator 8, the marking signal will not appear as audio frequency energy at the output of the converter 7.

However, at the same time that a marking signal is applied to the upper homodyne detector H1, it is also applied to the lower detection circuit H2. This latter circuit includes a similar non-tuned converter 9 which is supplied with wave energy from a second intermediate frequency adjustable oscillator 10. It is significant that the beating oscillator 10 is adjusted to generate waves having a frequency of 450.850 kilocycles which is precisely the same as the frequency of the spacing intermediate frequency waves. The wave energy from the oscillator 10 will heterodyne in the converter 9 with the marking signal to produce output energy having the difference frequency of 850 cycles. This resulting low frequency marking signal is now applied through an audio frequency transformer 11 to a conventional rectifier 12 which accordingly produces a corresponding direct current marking signal. The direct current marking signal is now supplied over a lead 13 to one side of a discriminator circuit 14 and also over a lead 15 to one side of a noise balancing circuit 16 which is coupled to the discriminator 14 by a lead 17.

Let it now be assumed that a spacing signal is received instead of a marking signal. Since the intermediate frequency value of this spacing signal is 450.850 kilocycles, which is identical with the frequency of the wave energy supplied by the oscillator 10, a homodyne action will take place in the converter 9. Due to the zero beat between the spacing signal and the wave energy from the oscillator 10, the spacing signal will not appear as audio frequency energy at the output of the converter 9. However, this spacing signal is, at this time, simultaneously applied to the converter 7 in the upper detection circuit H1. Here it is heterodyned with the 450.000 kilocycle energy from the oscillator 8 to produce an output signal from the converter 7 having the difference frequency of 850 cycles. It is to be noted that this low frequency spacing signal has a frequency value which is identical with that of the low frequency marking signal previously produced in the lower detection circuit H2.

The low frequency spacing signal produced in the above manner by the converter 7 is delivered through an audio frequency transformer 18 to another conventional rectifier 19 which consequently produces a corresponding direct current spacing signal. This last-mentioned signal is applied over a lead 20 to the other side of the discriminator circuit 14 and also over a lead 21 to the other side of the noise balancing circuit 16.

At this point, it should be emphasized that, as this is a frequency-shift radio telegraph receiving system, the marking and spacing signals appear only alternatively and not simultaneously. In other words, both marking and spacing signals are not present at the same time in this system. Accordingly, when a radio frequency marking signal, for example, is received by the antenna 1, it will pass through the receiving system and will be converted first into an intermediate frequency marking signal, then into a low frequency marking signal, and finally into a direct current marking signal. This last form of the signal will be applied to the discriminator circuit 14 over only its lower input lead 13. A received radio frequency spacing signal will be similarly converted into a direct current spacing signal current spacing signal which will be applied to the discriminator 14 over only its upper input lead 20. This separation of the signals results from the fact explained above that, due to the homodyne action, marking signals produce zero beat in one detector circuit H1 and spacing signals produce zero beat in the other detector circuit H2.

Referring now in more detail to the discriminator circuit 14, it can be seen in the drawing that the discriminator 14 includes two equal resistors 22 and 23 connected together with their midpoint coupled to the noise balancing circuit 16. A condenser 24 is connected across the resistor 22 and a similar condenser 25 is connected across the resistor 23. The midpoint between the condensers 24 and 25 is coupled to the noise balancing circuit 16. The outer ends of the resistors 22 and 23 are connected by leads 26 and 27, respectively, to the output terminals 28 and 29, respectively, of the discriminator 14. These ouput terminals 28 and 29 are connected to a utilization circuit 30 of any suitable type.

During operation of the discriminator 14, marking signals will be applied over the lead 13 to the lower side of the discriminator 14, and will thereby produce a voltage drop across only the resistor 23. Accordingly, all marking signals will produce a negative potential at the upper output terminal 28 and a positive potential at the lower output terminal 29. Similarly, since spacing signals are delivered over the lead 20 to the upper side of the discriminator 14, they will produce a voltage drop across only the resistor 22 thereby causing a positive potential to appear at the upper output terminal 28 and a negative potential to appear at the lower output terminal 29.

Thus, it can be understood that, due to the use of the parallel homodyne detectors H1 and H2, the discriminator 14 is able to convert the frequency-shift marking and spacing signals into corresponding direct current marking and spacing signals having respectively opposite polarities at the output terminals 28 and 29 of this receiving circuit. These direct current output signal voltages are applied to the utilization circuit 30 for performing any suitable function, such as effecting the operation of a printing telegraph machine.

It should be noted that the lead 17, which couples the discriminator 14 to the noise balancing circuit 16, is connected to a resistor 31 in the noise balancing circuit 16 in an adjustable manner. When this receiving system is to be operated, this connection is adjusted so that any noise currents which may be present will appear as equal values of direct current potential across each of the resistors 22 and 23. As these voltages appearing across the resistors 22 and 23 are always of opposite polarity, they will oppose each other and will be eliminated through cancellation. Consequently, no noise currents will appear at the output terminals 28 and 29 of the discriminator 14.

Any interfering signals which have not been eliminated by the selectivity of the other stages in this receiving system and which do not homodyne with the two beating oscillators 8 and 10 will produce heterodyne energies in each of the parallel detecting circuits H1 and H2. Although these heterodyne energies will be of different frequencies because of the difference in the frequencies of the beating oscillators 8 and 10, they will appear with equal amplitudes at the inputs to the rectifiers 12 and 19 due to the amplitude limiting function performed by the limiter 6. Therefore, they will appear as equal and opposing voltages at the inputs to the discriminator 14 with the result that they are substantially eliminated therein through cancellation so that no effective disturbing voltage will appear at the output terminals 28 and 29.

It should be noted that, since it is desirable that the band pass characteristic of the intermediate frequency amplifier 5 should be the same for both marking and spacing signals, the system does not divide into two parallel circuits until after the signals have passed through this amplifier 5. It should also be noted that no tuned filter circuits are used in either of the parallel circuits. It is necessary that the audio frequency response of the circuits following the converters 7 and 9 and also the resistance-capacitor time constants of the rectifiers 12 and 19 and the discriminator 14 be such that the repetition rate of the differential signal being received is passed through the receiving system. Since no amplitude limiting action is performed after the signals have passed through the limiter 6, it is desirable that the beating oscillators 8 and 10 should both have the same output amplitude in order to maintain a balanced condition at the inputs to the discriminator 14. It is also desirable to employ variable capacitors 32 and 33 in the leads indicated at 34 and 35 in the drawing for providing a controlled amount of coupling between the beating oscillators 8 and 10 and the signal inputs to each of the converters 7 and 9. This coupling will cause the frequency of the oscillators 8 and 10 to be pulled into synchronism with the frequency of the signaling energy whenever the frequency difference between them is not greater than about 100 cycles.

This receiving system is not limited to use with only frequency-shift signals that have a frequency separation of 850 cycles. If it should be desired to receive other frequency-shift signals having a different frequency separation, this receiving system may be readily adjusted for operation with these signals by adjusting the oscillating frequency of one or both of the beating oscillators 8 and 10 in order to obtain the desired homodyne action.

Furthermore, this receiving system is not restricted to use with only frequency-shift signals but may be readily adapted for detecting signals employing only a single frequency. This may be conveniently accomplished by adjusting one of the beating oscillators 8 and 10 to operate at the desired signal frequency and by adjusting the other oscillator to operate at a suitably different frequency outside the pass band of the intermediate frequency amplifier 5. Any other wave energies of different frequencies that may be present will be eliminated through cancellation in the same manner as that explained above in connection with the description of the elimination of interfering signals. This same procedure may be employed to detect wave energy of a specified frequency from among a group of received wave energies of various frequencies.

What is claimed is:

1. In a system for receiving wave energy comprising energy of a first frequency and energy of a second frequency separated in the frequency spectrum from said first frequency by a fixed frequency value, means for homodyning said energies to wave energy of a frequency equal to said fixed frequency value, said means including two beating oscillators producing oscillatory wave energy, the frequency of the wave energy produced by one of said oscillators being greater than the frequency of the wave energy produced by the other of said oscillators by an amount equal to said fixed frequency value.

2. In a system for receiving wave energy comprising energy of a first radio frequency and energy of a second radio frequency separated in the frequency spectrum from said first frequency by a fixed frequency value, means for converting said received first and second radio frequency energies to corresponding intermediate frequency energies having a third frequency and a fourth frequency, said fourth frequency being separated in the frequency spectrum from said third frequency by said fixed frequency value, and means for homodyning energies of both said third and fourth frequencies to corresponding low frequency energies having a fifth frequency the value of which is the same as said fixed frequency value, said last-mentioned means including a first source of oscillations of a frequency equal to said third frequency and a second source of oscillations equal to said fourth frequency.

3. A radio telegraph receiving system for receiving marking carrier waves and alternatively transmitted spacing carrier waves, said marking carrier waves being separated in the frequency spectrum from said spacing carrier waves by a fixed frequency value, said receiving means comprising in combination a mixer for converting said alternatively received marking and spacing carrier waves to corresponding alternative marking and spacing intermediate frequency waves having a frequency difference equal to said fixed frequency value, a limiter for limiting equally the amplitudes of said alternative marking and spacing intermediate frequency waves, homodyne detecting means for receiving said amplitude-limited alternative marking and spacing intermediate frequency waves and for deriving therefrom corresponding alternative marking and spacing low frequency waves each having a frequency equal to said fixed frequency value, said homodyne detecting means including a first oscillator generating oscillatory wave energy having a frequency equal to the frequency of said marking intermediate frequency waves and a second oscillator generating oscillatory wave energy the frequency of which is the same as the frequency of said spacing intermediate frequency waves, said homodyne detecting means also including a first frequency converter and a second frequency converter both coupled in parallel to said limiter, said homodyne detecting means further including means for applying wave energy from said first oscillator to only said first converter and means for applying wave energy from said second oscillator to only said second converter, said first converter being adapted to mix said marking and spacing intermediate frequency waves received from said limiter with said wave energy received from said first oscillator to produce low frequency spacing waves having a frequency equal to said fixed frequency value, said second converter being adapted to mix said marking and spacing intermediate frequency waves received from said limiter with said wave energy received from said second oscillator to produce low frequency marking waves having a frequency equal to said fixed frequency value, and means coupled to said first and second converters for deriving from said low frequency marking and spacing waves of equal frequency corresponding direct current marking and spacing signaling energies.

References Cited in the file of this patent

UNITED STATES PATENTS

| | | |
|---|---|---|
| 1,461,064 | Martin | July 10, 1923 |
| 1,752,303 | Kelley | Apr. 1, 1930 |
| 1,886,263 | Ilberg | Nov. 1, 1932 |
| 2,067,432 | Beverage | Jan. 12, 1937 |
| 2,378,299 | Hilferty | June 12, 1945 |

OTHER REFERENCES

Publication: "Homodyne Reception," from "Wireless World," April 1942, pages 87–89.